(12) United States Patent
Lagadec et al.

(10) Patent No.: US 12,398,025 B2
(45) Date of Patent: Aug. 26, 2025

(54) WINCH EQUIPPED WITH A VARIABLE TORQUE LIMITER

(71) Applicant: THALES, Courbevoie (FR)

(72) Inventors: Jean Lagadec, Brest (FR); Steve Bendelac, Brest (FR)

(73) Assignee: THALES, Courbevoie (FR)

( * ) Notice: Subject to any disclaimer, the term of this patent is extended or adjusted under 35 U.S.C. 154(b) by 332 days.

(21) Appl. No.: 18/266,244

(22) PCT Filed: Dec. 17, 2021

(86) PCT No.: PCT/EP2021/086601
§ 371 (c)(1),
(2) Date: Jun. 8, 2023

(87) PCT Pub. No.: WO2022/129577
PCT Pub. Date: Jun. 23, 2022

(65) Prior Publication Data
US 2024/0025712 A1    Jan. 25, 2024

(30) Foreign Application Priority Data
Dec. 17, 2020 (FR) .................. 2013449

(51) Int. Cl.
*B66D 1/58* (2006.01)
*B66D 5/12* (2006.01)
*F16D 43/21* (2006.01)

(52) U.S. Cl.
CPC ............ *B66D 1/58* (2013.01); *B66D 5/12* (2013.01); *F16D 43/216* (2013.01)

(58) Field of Classification Search
CPC .... B66D 5/14; B66D 5/22; B66D 1/58; F16D 43/216
See application file for complete search history.

(56) References Cited

U.S. PATENT DOCUMENTS

| | | | | | |
|---|---|---|---|---|---|
| 2,017,352 | A | * | 10/1935 | Quick ................. | B66D 1/14 254/350 |
| 3,572,482 | A | * | 3/1971 | Kalpas ................ | B66D 5/00 192/223.1 |
| 4,175,727 | A | * | 11/1979 | Clarke ................. | B66D 5/26 254/274 |
| 2002/0084154 | A1 | * | 7/2002 | Peter .................. | B60T 13/746 188/158 |
| 2008/0190714 | A1 | * | 8/2008 | Pan .................... | B66D 1/58 188/71.2 |
| 2014/0083806 | A1 | * | 3/2014 | Miyazaki ............. | B66D 5/28 188/151 R |
| 2016/0340158 | A1 | * | 11/2016 | Maghsoodi .......... | F16D 13/75 |
| 2020/0307971 | A1 | * | 10/2020 | Maghsoodi .......... | B66D 5/14 |

FOREIGN PATENT DOCUMENTS

| DE | 100 34 336 C2 | 1/2003 | |
|---|---|---|---|
| EP | 3 028 983 A1 | 6/2016 | |
| WO | WO-2009062232 A1 * | 5/2009 | ............... B66D 1/16 |

* cited by examiner

*Primary Examiner* — Anna M Momper
*Assistant Examiner* — Nathaniel L Adams
(74) *Attorney, Agent, or Firm* — BakerHostetler

(57) ABSTRACT

A winch includes a rotary drum, a cable which can be wound on the drum in multiple layers, and a brake for braking the rotation of the drum, the brake being calibrated to permit the rotation of the drum beyond a variable torque which decreases as the length of the cable wound on the drum increases.

8 Claims, 1 Drawing Sheet

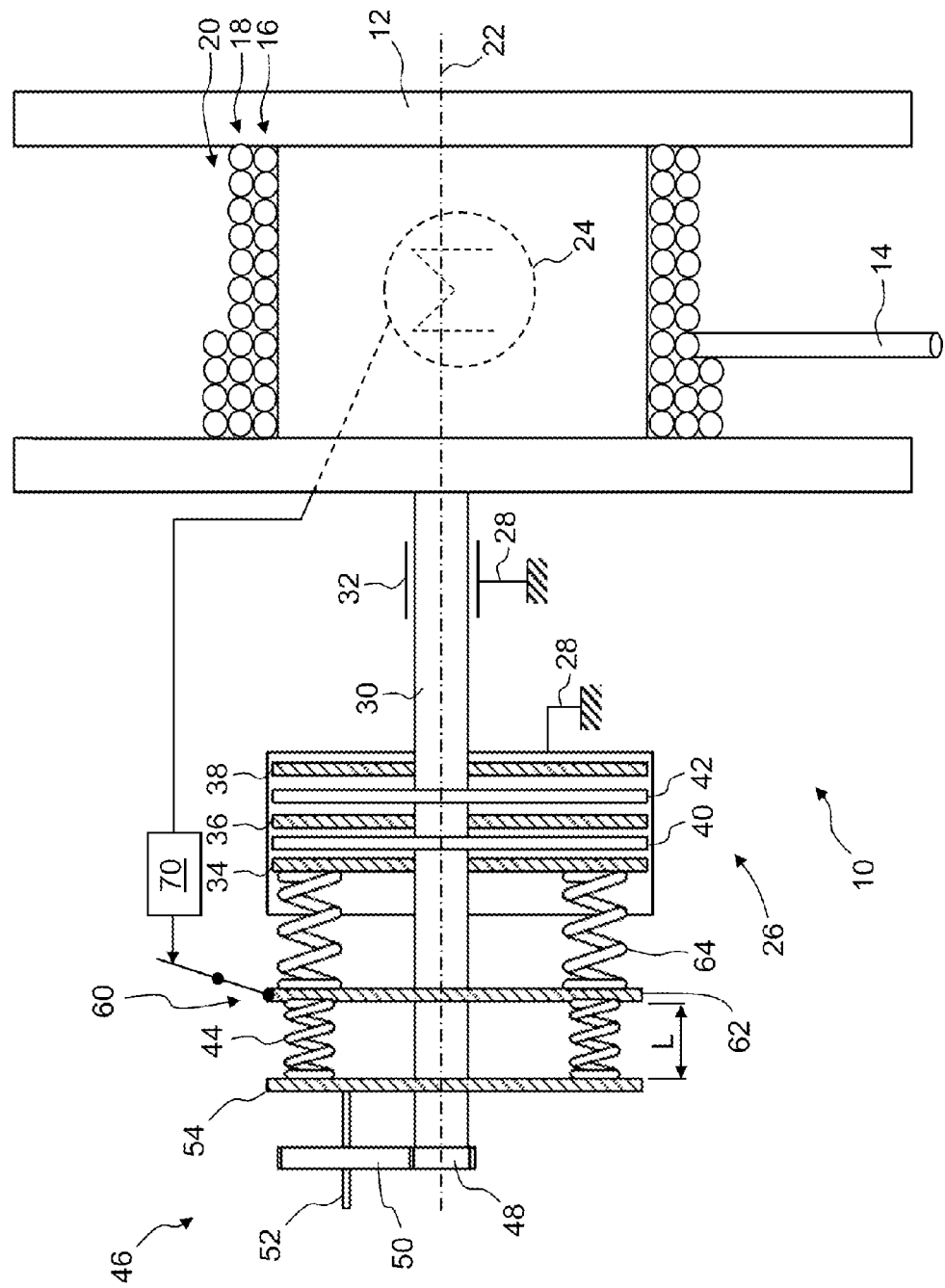

WINCH EQUIPPED WITH A VARIABLE TORQUE LIMITER

CROSS-REFERENCE TO RELATED APPLICATIONS

This application is a National Stage of International patent application PCT/EP2021/086601, filed on Dec. 17, 2021, which claims priority to foreign French patent application No. FR 2013449, filed on Dec. 17, 2020, the disclosures of which are incorporated by reference in their entirety.

FIELD OF THE INVENTION

A winch generally comprises a drum around which a cable supporting a load is wound. An excessive force applied to the cable can damage the winch and notably the cable, the drum or its drive device. The invention relates to the safety linked to the extraordinary forces that can act on the cable of a winch.

BACKGROUND

In a winch used to lift the load, the forces transmitted by the cable are generally well controlled. This involves the weight of the load. Once it has been lifted, the force remains substantially constant, considering that the traction speed is low and does not change much. It is easy to provide protection from disruptive forces by measuring the force, for example using a force sensor. It is then possible to compare the measurement to a reference and inform the user of the winch when the force measured exceeds the reference, enabling the user to react suitably, notably by stopping the winch.

In towing winches, used notably on board ships or helicopters to launch various objects, such as for example sonar antennae, seismic sensors, etc., the force variations on the cable can be very violent and very sudden. These variations can be caused for example by the navigation conditions of the ship, or by the collision of the towed object with an obstacle.

In view of these severe increases in tension on the cable, it is necessary to protect the cable from breaking, since in many cases the cable subjected to an excessive force stretches and thus accumulates potential energy which can be released instantaneously if the cable breaks. This explains the fact that, when breakage occurs, the cable makes very violent whiplash movements. These movements can then damage the blades of a helicopter or the integrity of its cabin, this representing a considerable danger for the helicopter and its occupants. In the case of a ship, the operators who are close to the winch and perform the launch and recovery of the towed objects can also be in danger if the cable breaks.

The protection of persons and equipment must of course be ensured whether the winch is under tension or not.

One way of providing protection against these violent forces is to oversize the winch, its cable and the equipment which surrounds it, in order for them to resist the extraordinary forces to which the cable might be subjected. Oversizing is rarely desirable since it requires a significant increase in mass of the equipment, this being impossible in practice in the case of equipment which is on board a helicopter. The result would be a mass which is incompatible with this type of carrier. Furthermore, even if it is possible to protect the winch itself, it is virtually impossible to protect the surroundings of the winch and notably the blades of the rotors and the cabin itself.

Another way of providing protection against these excess tensions is to let the cable be paid out by way of a torque limiter on the axle of the winch. The torque limiter permits the drum of the winch to slide in relation to its drive shaft in order to make it possible for the cable to unwind, thus limiting the force to which it is subjected.

However, the limitation of the force on the cable by way of a torque limiter has a drawback. When the cable is wound in multiple layers, the torque from which the limiter operates corresponds to a variable force on the cable depending on the number of layers of the cable on the drum. More specifically, the torque is equal to the force on the cable multiplied by the radius of the winding layer. For a given torque from which the limiter operates, the more the cable is wound on the drum, the more the force exerted on the cable to trigger the torque limiter decreases. Depending on the tolerances of the torque limiter, and on the variation in the winding diameter of the cable on the drum between the first layer in contact with the barrel of the drum and the winding layer, the dimensioning may be impossible. For example, it is possible that the torque for which it is to be ensured that the cable pays out when it is at the barrel of the drum is less than the torque for which it is to be ensured that the cable does not pay out when it is in the last layer on the drum.

SUMMARY OF THE INVENTION

The invention aims to propose a solution for ensuring sliding of the cable for a force which does not vary much, even when the cable can be wound on the drum with a great number of layers.

To that end, the invention relates to a winch comprising a frame, a drum which can rotate in relation to the frame about an axis of rotation, a cable which can be wound on the drum in multiple layers, a brake for braking the rotation of the drum, the brake being calibrated to permit the rotation of the drum beyond a variable torque which decreases as the length of the cable wound on the drum increases, and a mechanism for adjusting the torque exerted by the brake comprising a screw-nut system of which the nut is driven in rotation with the drum, and of which a translational movement of the screw driven by the nut is configured to adjust the torque exerted by the brake In a particular embodiment, the brake comprises at least one first plate which is movable in translation in relation to the frame along the axis of rotation of the drum and is prevented from rotating in relation to the frame about the axis of rotation of the drum, at least one second plate which is prevented from rotating in relation to the drum about the axis of rotation of the drum, a compression element designed to compress the first plate against the second plate along the axis of rotation of the drum, the adjusting mechanism being configured to adjust the compression of the compression element depending on the rotation of the drum.

The compression element may be a first elastic element which exerts a force proportional to its length along the axis of rotation of the drum.

The winch may comprise a mechanism for manoeuvring the brake between two positions, a first position enabling the free rotation of the drum and a second position in which the brake opposes the rotation of the drum up to the variable torque.

The winch may comprise a motor for making the drum rotate, and a control module permitting the rotation of the motor in the first position of the brake manoeuvring mechanism and preventing the rotation of the motor in the second position of the brake manoeuvring mechanism.

The brake manoeuvring mechanism is advantageously configured to deactivate the adjusting mechanism in the first position of the brake.

The brake manoeuvring mechanism may comprise a third plate disposed between the first elastic element and the first plate, the third plate being movable in translation along the axis of the drum, and wherein the brake manoeuvring mechanism is configured to compress the first elastic element by moving it away from the first plate in its first position and to leave the third plate free in its second position.

The brake manoeuvring mechanism may comprise a second elastic element disposed between the first plate and the third plate.

BRIEF DESCRIPTION OF THE DRAWINGS

The invention will be better understood and further advantages will emerge on reading the detailed description of an embodiment which is given by way of example, this description being illustrated by the appended drawing in which:

FIG. 1 shows a preferred embodiment of a winch according to the invention.

For the sake of clarity, identical elements bear the same references in the various FIGURES.

DETAILED DESCRIPTION

FIG. 1 schematically shows an example of a winch 10 according to the invention. The winch 10 comprises a drum 12 and a cable 14 which can be wound on the drum 12. The cable 14 can be wound in multiple layers around the drum 12. FIG. 1 shows two complete layers 16 and 18 and one partial layer 20, referred to as winding layer. The more the cable 14 is wound, the more the number of layers increases. The drum 12 is rotatable about an axis 22. The rotation of the drum 12 makes it possible to wind and unwind the cable 14 depending on the direction of rotation. The rotation can be driven by a motor 24, which is for example disposed inside the drum 12.

According to the invention, the winch 10 comprises a brake 26 for braking the rotation of the drum 12. In the example shown, the brake 26 comprises surfaces which come into contact with one another to provide the braking. A first type of surfaces is prevented from rotating in relation to a frame 28 of the winch 10 and a second type of surfaces is prevented from rotating in relation to the drum 12. Prevention from rotating is understood to mean: suppression of a degree of rotational freedom about the axis 22. A complete connection makes it possible to prevent the rotation. As an alternative to the complete connection, aside from the suppressed degree of rotational freedom, other degrees of freedom can remain, notably to enable the positioning of the two types of surfaces in relation to one another by avoiding an excessively tightly fitting chain of dimensions. The two types of surfaces can rub against one another until the drum 12 stops. The invention is interested in parking braking and in the possible sliding of the brake 26 to avoid the cable 14 being subject to excessive tension. The brake 26 may also be used to decelerate the rotation of the drum 12 by converting the kinetic energy of the drum 12 to heat energy by way of the friction between the two surfaces. As an alternative, other types of brakes can be implemented within the context of the invention, for example by converting the kinetic energy of the drum 12 to another energy, for example electrical or pneumatic energy.

The brake 26 is calibrated to permit the rotation of the drum 12 beyond a variable torque which increases as the length of the cable 14 wound on the drum 12 increases. When the drum 12 is at a standstill, for a given number of layers of the cable 14 that is wound on the drum 12, the traction force on the cable 14 is equal to the resistive torque that keeps the drum 12 at a standstill divided by the radius of the winding layer, the layer 20 in FIG. 1. If deterioration or even breakage of the cable 14 is to be avoided, it is important to limit the traction force on the cable. To do this, a maximum force above which the cable must be able to "pay out" is defined. In other words, above the maximum force, the drum 12 rotates under the traction of the cable 14 to allow the cable 14 to unwind and thus avoid exceeding the maximum permitted traction force. Owing to the variable number of turns wound on the drum 12, by varying the maximum torque absorbed by the brake depending on the length of the unwound cable, it is possible to keep the force linked to this torque as constant as possible over the entire length of the cable.

To be as precise as possible and maintain a properly constant force, it would be necessary to vary the maximum torque of the brake 26 depending on the number of the last layer of the wound cable. If the winch 10 has a spooling gear for best arranging the layers on the drum 12, this spooling gear can transmit the information on the change of layer which makes it possible to increment the maximum torque of the brake. As an alternative, to simplify the winch 10, it is possible to continuously vary the maximum torque of the brake by approximating the increments. The embodiment of FIG. 1 can be inscribed in this continuous variation of the maximum torque of the brake above which the brake slides by enabling the rotation of the drum 12 and the unwinding of the cable 14.

In the embodiment of FIG. 1, the drum 12 is secured to a shaft 30 extending along the axis 22. The shaft 30 is connected to the frame 28 by way of a rotary bearing 32, shown schematically in FIG. 1. This may involve rolling bearings that carry the assembly of the drum 12 and its shaft 30. Any other type of bearing is possible. The shaft 30 may also be used to transmit energy from the motor 24 to the drum 12.

In the example shown, the brake 26 comprises three plates 34, 36 and 38 which are movable in translation in relation to the frame 28 along the axis 22. The plates 34, 36 and 38 are prevented from rotating in relation to the frame 28 about the axis 22. The brake also comprises two plates 40 and 42 which are prevented from rotating in relation to the shaft 30. At least one of the plates 40 or 42 is free to move in translation in relation to the shaft 30. The plates 34, 36 and 38, which are prevented from rotating in relation to the frame 28, and the plates 40 and 42, which are prevented from rotating in relation to the shaft 30, alternate. To ensure the braking of the drum 12, the plates 34, 36 and 38 sandwich the plates 40 and 42. In practice, the invention can be implemented irrespective of the number of plates that are prevented from rotating in relation to the frame 28 and the number of plates that are prevented from rotating in relation to the shaft 30 provided that these plates face one another and that a means for pressurizing these two types of plates is provided. The resistive torque that the brake 26 can bring about to oppose the rotation of the drum 12 is proportional to the surface area and the number of interfaces between the two types of plates and to the force exerted to press the plates against one another. As a result, to limit the force that is to be exerted, it can be advantageous to increase the number of plates of the two types. In the example shown, there is one more plate that is prevented from rotating in relation to the frame 28 than there are plates that are prevented from rotating in relation to the shaft 30. In the example shown, two plates that are prevented from rotating in relation to the shaft 30, the plates 40 and 42, are used. In order to enable the compression of the plate 36, the plates 40 and 42 should have a degree of freedom in translational movement in relation to the shaft 30 whilst still being prevented from rotating in relation in relation to the shaft 30. The connection between the plates 40, 42 and the shaft 30 can be provided by grooves extending along the axis 22. Furthermore, the plates 40 and 42 are prevented from rotating in relation to the shaft 30, which is itself secured to the drum 12. It would also be possible for one of the flanges of the drum 12 to perform the function of the two plates 40 and 42.

The various plates 34 to 42 have for example a circular cross section around the axis 22. The two types of plates 34, 36 and 38, for the one part, and 40 and 42, for the other part, have the same diameter, this simplifying the production of the brake 26. Any other shape of the plate is possible. It is even possible to provide multiple plates of one of the types facing a single plate of the other type. It is, for example, possible to provide a pair of shoes, which are prevented from rotating in relation to the frame 28 about the axis 22, which compress a disk secured to the drum 12. Multiple pairs of shoes can be implemented around one and the same disk.

The brake 26 comprises a compression element designed to compress the plates 34 to 42 against one another. In FIG. 1, the compression element is an elastic element 44 is shown in the form of multiple helical springs. A single helical spring wound around the axis 22 can also be implemented. The compressive force is proportional to the length L of the elastic element 44 along the axis 22. Any other compression element may also be used. The compression can for example be hydraulic or pneumatic, with the compressive force being proportional to the pressure of the fluid used.

The brake 26 also comprises a mechanism 46 for adjusting the torque exerted by the brake. In the example shown in FIG. 1, the adjusting mechanism 46 makes it possible to adjust the force exerted by the compression element 44 depending on the rotation of the drum 12. More specifically, when the drum 12 rotates so as to unwind the cable 14, the number of layers of the cable 14 wound on the drum 12 decreases and the adjusting mechanism 46 is configured such that the force exerted by the compression element 44 decreases so as to reduce the maximum torque able to be exerted by the brake 26 before it slides. The variation of the force exerted by the compression element 44 depending on the rotation of the drum 12 is defined so as to keep the force exerted on the cable 14 in accordance with the maximum torque of the brake 26 substantially constant or at the very least substantially constant between two successive winding layers of the cable 14 all along its winding around the drum 12.

When the compression element 44 is an elastic element of which the length L is to be varied depending on the rotation of the drum 12, the adjusting mechanism 46 is configured to convert a rotational movement of the drum 12 into a translational movement of one of the ends of the elastic element 44. A screw-nut system is well suited to this conversion of movement. Other movement conversion mechanisms are also possible, such as a cam mechanism or an eccentric mechanism. It is also possible to implement a double-acting linear cylinder for displacing the adjustable end of the elastic element 44. The chambers of the cylinder are supplied by a two-way pump actuated by the rotation of the shaft 30. To return to the screw-nut system, the shaft 30 may be threaded and a nut interacting with this thread may bear against the elastic element 44 to adjust the length L of the latter. The thread makes it possible to establish a linear function between the angular position of the drum 12 about its axis 22 and the maximum torque of the brake. The pitch of the thread defines the gradient of the linear function.

It is possible that the desired gradient requires a thread pitch which is too small to be easily produced on the shaft 30 and on the associated nut. It is then possible to provide a reduction in speed between the rotation of the drum 12 and that of the nut, as shown in FIG. 1. More specifically, the adjusting mechanism 46 comprises a pinion 48 secured to the shaft 30 and a toothed wheel that forms a nut 50 and meshes with the pinion 48. The number of teeth of the pinion 48 is smaller than that of the nut 50, this enabling a reduction in speed between the drum 12 and the nut 50. A screw 52 interacts with the nut 50 and bears against a chock 54 against which the elastic element 44 bears. The rotation of the drum 12 displaces the chock 54 in translation along the axis 22. As an alternative to a simple geartrain like that formed by the toothed wheel 48 and the nut 50, any other speed reduction mechanism is of course possible between the shaft 30 and the nut 50. It is possible for example to provide a chain mechanism, a mechanism comprising multiple geartrains, a planetary geartrain, etc.

Other forms of brakes can be implemented within the context of the invention. It is for example possible to implement a brake usually referred to as a drum brake, wherein an inner cylindrical surface of axis 22 rotates with the shaft 30. On the inside of this surface, shoes which can move radially in relation to the axis 22 bear against the inner cylindrical surface. The shoes are rotatably connected to the frame 28 about the axis 22. The braking torque is a function of the bearing force of the shoes against the inner cylindrical surface. The torque adjusting mechanism then radially displaces the shoes to modify the torque exerted by the brake. In the torque adjusting mechanism, there is a screw-nut system. The translational movement of the screw is radial and the nut driving the screw rotates about the radial axis of the screw and is moved by the shaft 30 via an angular member.

The brake 26 is useful when the winch 10 is at a standstill, in other words when the drum 12 is not rotating and when a force lower than the maximum acceptable force is exerted on the cable 14. In this situation, the motor 24 is at a standstill. When the winch 10 is to be manoeuvred by actuating the motor 24, it is useful to release the brake 26. To that end, the winch 10 comprises a brake manoeuvring mechanism 60. The mechanism 60 has two end positions: a first position, with the brake released, makes it possible for the drum 12 to freely rotate and a second position, with the brake applied, in which the brake 26 opposes the rotation of the drum 12. It is possible to control the mechanism 60 continuously between the two end positions in order to gradually brake or release the drum 12. It is in the position in which the brake 26 is applied that the plates 34 to 42 are compressed against one another and that the drum 12 remains immovable as long as the given variable torque has not been reached. When the brake 26 is released, the motor 24 can act as torque limiter by permitting the cable 14 to pay out if an excessive force is applied to it. Advantageously, the mechanism 60 is coupled to the limiter of the limiter of the variable torque exerted by the elastic element 44. More specifically, the brake manoeuvring mechanism 60 is configured to deactivate the compression adjusting mechanism 46 of the first elastic element 44 in the first position of the brake 26.

An example of a brake manoeuvring mechanism 60 is shown in FIG. 1. The mechanism 60 comprises a plate 62 disposed between the elastic element 44 and the plate 34. The plate 62 is movable in translation along the axis 22. In a movement toward the left in FIG. 1, the plate 62 compresses the spring 44 by moving it away from the plate 34. In other words, the plate 62 prevents the spring 44 from compressing the plates 34 to 42 together. The movement of the plate 62 toward the left releases the brake 26. Conversely, to reapply the brake 26, the plate 62 is left free and the spring 44 can compress the plates 34 to 42 together.

The brake manoeuvring mechanism 60 may additionally comprise another elastic element 64 disposed between the plate 34 and the plate 62. The elastic element 64 also deforms along the axis 22. When the brake 26 is applied, the plate 62 is allowed to move freely in translation along the axis 22 and the elastic element 64 fully transmits the force exerted by the elastic element 44. By contrast, when the plate 62 is displaced toward the left, the elastic element 64 expands and no longer transmits the force exerted by the elastic element 44 in order to release the brake 26. In this position of the brake, the elastic element 64 is preloaded so as to exert only a minimum force on the plate 34. The elastic element 64 makes it possible simply to compensate for the functional clearances between the plates 34 to 42 with as little compression as possible.

As an alternative to the disposition of the plate 62 and the elastic element 64 shown in FIG. 1, it is possible to position a brake manoeuvring device on the right-hand side of the plates 34 to 38, enabling a translational movement of the plate 38 between a position with the brake applied in which the elastic element 44 bears against the plate 34, and a position with the brake released in which the elastic element 44 bears to virtually no extent, allowing for the compensation of the functional clearances. However, this disposition of the brake manoeuvring device on the right-hand side makes it more difficult to produce the brake manoeuvring device.

The winch 10 may comprise a control module 70 which controls both the motor 24 and the brake manoeuvring mechanism 60 in a coordinated manner. More specifically, the control module 70 permits the rotation of the motor 24 when the brake is released and prevents the rotation of the motor 24 when the brake is applied.

The invention claimed is:

1. A winch comprising a frame, a drum which can rotate in relation to the frame about an axis of rotation, a cable which can be wound on the drum in multiple layers, a brake for braking the rotation of the drum, the brake being calibrated to permit the rotation of the drum beyond a variable torque which decreases as the length of the cable wound on the drum increases, and a mechanism for adjusting the torque exerted by the brake comprising a screw-nut system of which the nut is driven in rotation with the drum, and of which a translational movement of the screw driven by the nut is configured to adjust the torque exerted by the brake.

2. The winch as claimed in claim 1, wherein the brake comprises at least one first plate which is movable in translation in relation to the frame along the axis of rotation of the drum and is prevented from rotating in relation to the frame about the axis of rotation of the drum, at least one second plate which is prevented from rotating in relation to the drum about the axis of rotation of the drum, a compression element designed to compress the first plate against the second plate along the axis of rotation of the drum, and wherein the adjusting mechanism is configured to adjust the compression of the compression element depending on the rotation of the drum.

3. The winch as claimed in claim 2, wherein the compression element is a first elastic element which exerts a force proportional to its length (L) along the axis of rotation of the drum.

4. The winch as claimed in claim 2, comprising a mechanism for manoeuvring the brake between two positions, a first position enabling the free rotation of the drum and a second position in which the brake opposes the rotation of the drum up to the variable torque, wherein the brake manoeuvring mechanism is configured to deactivate the adjusting mechanism in the first position of the brake.

5. The winch as claimed in claim 4, wherein the brake manoeuvring mechanism comprises a third plate disposed between the first elastic element and the first plate, the third plate being movable in translation along the axis of the drum, and wherein the brake manoeuvring mechanism is configured to compress the first elastic element by moving it away from the first plate in its first position and to leave the third plate free in its second position.

6. The winch as claimed in claim 5, wherein the brake manoeuvring mechanism comprises a second elastic element disposed between the first plate and the third plate.

7. The winch as claimed in claim 1, comprising a mechanism for manoeuvring the brake between two positions, a first position enabling the free rotation of the drum and a second position in which the brake opposes the rotation of the drum up to the variable torque.

8. The winch as claimed in claim 7, comprising a motor for making the drum rotate, and a control module permitting the rotation of the motor in the first position of the brake manoeuvring mechanism and preventing the rotation of the motor in the second position of the brake manoeuvring mechanism.

* * * * *